(12) United States Patent
Wade et al.

(10) Patent No.: US 12,093,363 B2
(45) Date of Patent: Sep. 17, 2024

(54) 3D OBJECT VERIFICATION SYSTEM AND METHOD

(71) Applicant: Shopify Inc., Ottawa (CA)

(72) Inventors: Jonathan Wade, Ottawa (CA); Stephan Leroux, East Gwillimbury (CA); Daniel Beauchamp, Toronto (CA); Andrew Ngo, Toronto (CA)

(73) Assignee: Shopify Inc., Ottawa (CA)

( * ) Notice: Subject to any disclaimer, the term of this patent is extended or adjusted under 35 U.S.C. 154(b) by 239 days.

(21) Appl. No.: 17/831,644

(22) Filed: Jun. 3, 2022

(65) Prior Publication Data

US 2023/0394131 A1    Dec. 7, 2023

(51) Int. Cl.
*G06F 21/36* (2013.01)
*G01S 7/48* (2006.01)
*G01S 17/86* (2020.01)
*G06F 21/62* (2013.01)
*G06V 20/64* (2022.01)

(52) U.S. Cl.
CPC ............ *G06F 21/36* (2013.01); *G01S 7/4802* (2013.01); *G01S 17/86* (2020.01); *G06F 21/629* (2013.01); *G06V 20/647* (2022.01); *G06V 2201/12* (2022.01)

(58) Field of Classification Search
CPC ........ G06F 21/36; G06F 21/629; G01S 17/86; G06V 20/647; G06V 2201/653; G06S 7/4802

USPC ............................................... 345/653; 702/2
See application file for complete search history.

(56) References Cited

U.S. PATENT DOCUMENTS

| | | | |
|---|---|---|---|
| 2004/0098200 A1* | 5/2004 | Wentland | G01V 11/00 702/2 |
| 2016/0271477 A1* | 9/2016 | Mann | A63B 69/3676 |
| 2020/0050901 A1* | 2/2020 | Kirchner | G06V 10/7788 |
| 2021/0073545 A1* | 3/2021 | Buchaca | G06V 20/35 |
| 2021/0146942 A1* | 5/2021 | Hrabe | G01S 17/931 |
| 2021/0310812 A1* | 10/2021 | Connell | G01C 21/32 |
| 2022/0244838 A1* | 8/2022 | Bereza | G06T 19/20 |

* cited by examiner

Primary Examiner — Prabodh M Dharia
(74) Attorney, Agent, or Firm — Rowand LLP

(57) ABSTRACT

The present disclosure provides a system and method for object verification. The method comprises obtaining sensor data, from one or more sensors, the sensor data including measurements of one or more physical properties of a given three-dimensional (3D) object, wherein the sensor data comprises a first measurement of the one or more physical properties from a first perspective and a second measurement of the one or more physical properties from a second perspective, the second perspective being different from the first perspective. The method further comprises comparing the sensor data with reference data, the reference data including measurements of one or more corresponding physical properties of a reference 3D object, and generating, based on the comparing, a verification signal indicating a determined match between the given 3D object and the reference 3D object.

22 Claims, 7 Drawing Sheets

FIG. 3

3D OBJECT VERIFICATION SYSTEM AND METHOD

FIELD

The present disclosure is related to a system and method for verifying a three-dimensional (3D) object relative to a reference 3D object. In particular, the present disclosure is related to a system and method where, when the 3D object is matched with the reference 3D object, the level of confidence in the match that is required to verify the 3D object can, in some examples, be dependent on a desired level of security.

BACKGROUND

There is a growing interest in using computer vision to recognize 3D objects, for example to identify a class of objects (e.g., in autonomous driving applications) or to identify a product model (e.g., in some retail applications). It would be useful to extend the use of computer vision to other tasks.

SUMMARY

Current object verification technology is focused on determining an object's general class and/or model from one particular instance of the object, for example as may be used for consumer product identification purposes. It does not compare small (perhaps even micro) details in order to distinguish one instance of the object from another instance of the object in the same class/model.

Accordingly, it would be useful to provide computer vision methods and systems that recognize 3D objects at a greater level of specificity and accuracy. Such systems and methods may be useful as product verification for purposes of security, such as to verify a 3D key, and/or other content access purposes.

In various examples, the present disclosure describes methods and systems for object verification by obtaining different physical measurements of physical characteristics of the 3D object, and comparing those physical measurements with corresponding physical measurements of the reference 3D object. The respective physical measurements may be processed into a comparable form before being compared. The present method allows for comparison of small (perhaps even micro), and a greater range of, physical details in order to verify whether one instance of an object (the given 3D object) matches the reference 3D object. In some applications, confidence levels may be used to verify whether the 3D object matches the reference 3D object. Examples of the present disclosure further enable modifying difference and confidence thresholds in order to achieve different desired levels of security. If a higher level of security is desired, the difference threshold may be set lower, and the confidence threshold may be set higher. If a lower level of security is sufficient, the difference threshold may be set higher, and the confidence threshold may be set lower.

In some examples, the present disclosure describes a system comprising: memory storing reference data, the reference data including measurements of one or more physical properties of a reference 3D object; and a processing unit coupled to the memory and configured to execute instructions to cause the system to: obtain sensor data, from one or more sensors, the sensor data including measurements of one or more physical properties of a given three-dimensional (3D) object, wherein the sensor data comprises a first measurement of the one or more physical properties from a first perspective and a second measurement of the one or more physical properties from a second perspective, the second perspective being different from the first perspective; compare the sensor data with the reference data; and generate, based on the comparing, a verification signal indicating a determined match between the given 3D object and the reference 3D object.

In some examples, the present disclosure describes a computer-implemented method comprising: obtaining sensor data, from one or more sensors, the sensor data including measurements of one or more physical properties of a given three-dimensional (3D) object, wherein the sensor data comprises a first measurement of the one or more physical properties from a first perspective and a second measurement of the one or more physical properties from a second perspective, the second perspective being different from the first perspective; comparing the sensor data with reference data, the reference data including measurements of one or more corresponding physical properties of a reference 3D object; and generating, based on the comparing, a verification signal indicating a determined match between the given 3D object and the reference 3D object.

In some examples, the present disclosure describes a computer-readable medium storing instructions that, when executed by a processor of a system, causes the system to: obtain sensor data, from one or more sensors, the sensor data including measurements of one or more physical properties of a given three-dimensional (3D) object, wherein the sensor data comprises a first measurement of the one or more physical properties from a first perspective and a second measurement of the one or more physical properties from a second perspective, the second perspective being different from the first perspective; compare the sensor data with reference data, the reference data including measurements of one or more corresponding physical properties of a reference 3D object; and generate, based on the comparing, a verification signal indicating a determined match between the given 3D object and the reference 3D object.

In any of the above examples, comparing the sensor data with the reference data comprises combining the measurements of the one or more physical properties of the given 3D object to generate a candidate digital model of the given 3D object; and comparing the candidate digital model of the given 3D object with the reference data comprising a reference digital model of the reference 3D object.

In any of the above examples, comparing the sensor data with the reference data comprises calculating differences between the sensor data and the reference data, and determining that the differences falls below a defined difference threshold.

In any of the above examples, determining the match comprises: determining, from the calculated differences, a confidence level of matching between the given 3D object and the reference 3D object; and in response to a determination that the confidence level equals or exceeds a defined confidence threshold, verifying the given 3D object.

In any of the above examples, the determined confidence level matches or exceeds a first confidence threshold associated with a first security level and falls below a second confidence threshold associated with a second security level, the defined confidence threshold being the first confidence threshold, and wherein the given 3D object is verified for the first security level and not verified for the second security level.

In any of the above examples, at least one of the one or more sensors is a camera and wherein the sensor data includes at least two 2D images of the 3D object obtained from different perspectives between the camera and the given 3D object, and wherein measurements of at least one of the one or more physical properties are captured in the at least two 2D images of the 3D object.

In any of the above examples, the given 3D object comprises a hologram, and each of the at least two 2D images of the 3D object includes a respective image of the hologram, a state of the hologram captured in each respective image being used to correlate to the respective perspective of the given 3D object in each 2D image.

In any of the above examples, the one or more physical properties of the given 3D object comprises one or more of color, size, microsurface detail, identifying marks, metallicness/nonmetallic-ness, and surface roughness.

In any of the above examples, the one or more physical properties comprises a material composition of the given 3D object based on light scattering from the given 3D object captured in the at least two 2D images of the given 3D object.

In any of the above examples, one of the one or more sensors is a LIDAR sensor and one of the one or more physical properties of the given 3D object is a 3D surface geometry or topology.

In any of the above examples, reference data is further obtained, from one or more sensors, including measurements of the one or more corresponding physical properties of the reference 3D object and storing the one or more corresponding physical properties of the reference 3D object for comparison.

In any of the above examples, generating the verification signal comprises generating an unlocking signal to unlock a physical lock, or an access signal to grant access to restricted software or website options.

BRIEF DESCRIPTION OF THE DRAWINGS

Reference will now be made, by way of example, to the accompanying drawings which show example embodiments of the present application, and in which:

FIG. 3 is an example homepage of an administrator, which may be accessed via the e-commerce platform of FIG. 2;

Similar reference numerals may have been used in different figures to denote similar components.

DESCRIPTION OF EXAMPLE EMBODIMENTS 3D objects have numerous physical characteristics and properties that help to distinguish them from other similar 3D objects and from 2D images. 3D objects are also more difficult to replicate than 2D images. Thus, obtaining and comparing 3D physical measurements of 3D objects allows for greater specificity and accuracy during verification than when verifying a 3D object using a 2D image of the 3D object. Computer vision systems in the past have been known to be fooled by 2D photos of a face (for example) in facial recognition technology.

The present disclosure describes example methods and systems for object verification of a 3D object with respect to a reference 3D object. Different physical measurements of physical characteristics of the 3D object is obtained and compared with corresponding physical measurements of the reference 3D object. Based on comparisons of the physical measurements, a match may or may not be determined. In some examples, a confidence level of the determined match is taken into account in performing the object verification.

Figure 1:
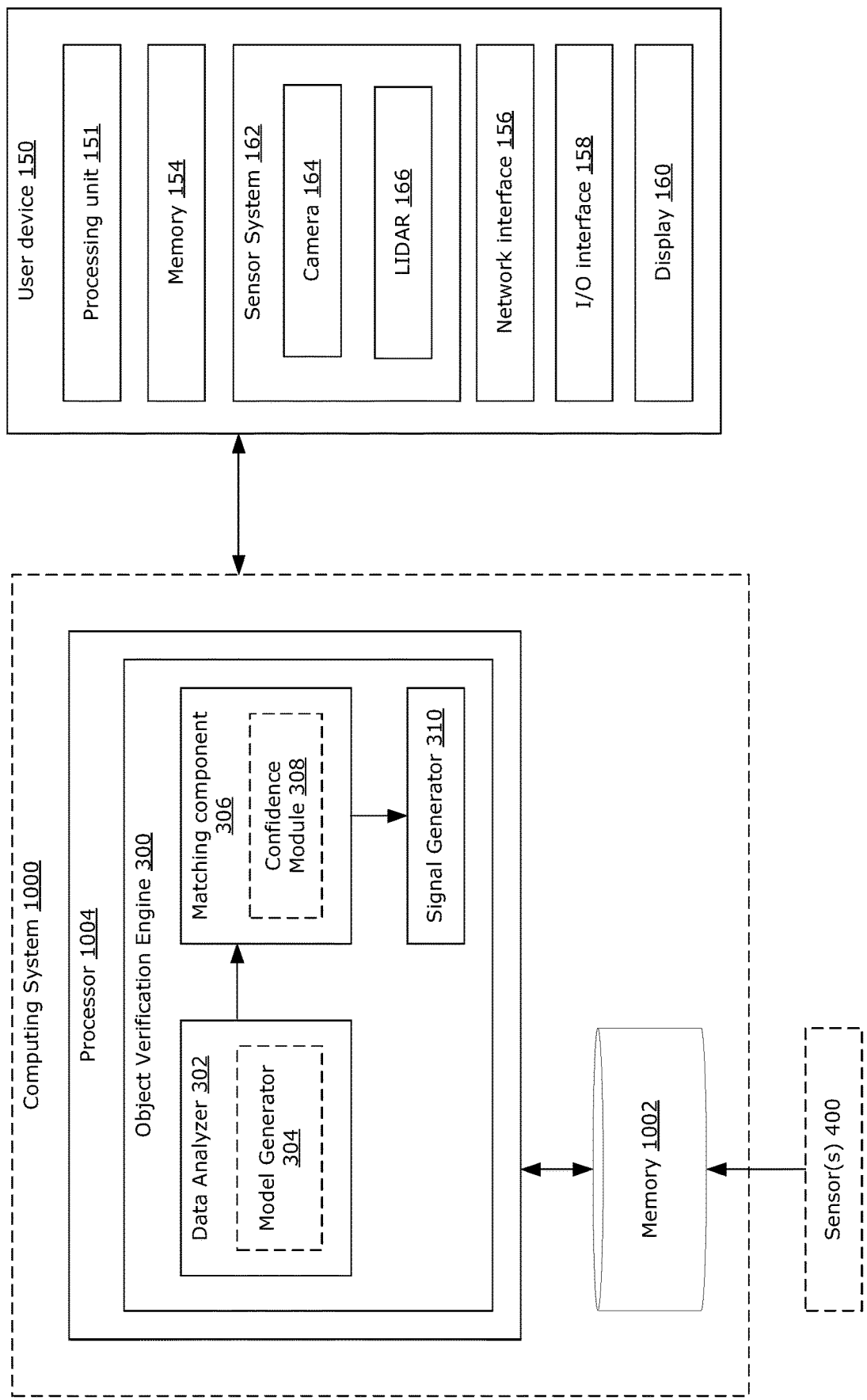
FIG. 1 is a is a block diagram of an embodiment of a system of the present disclosure including an object verification engine in which examples described herein may be implemented.

The examples disclosed herein may be implemented using a computing system 1000, as shown in FIG. 1. Computing system 1000 is depicted having at least one processor 1004 and a memory 1002. The processor 1004 may be a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 1002 may include a volatile or non-volatile memory (e.g., a flash memory, a random access memory (RAM), and/or a read-only memory (ROM)). The memory 1002 may store instructions for execution by the processor 1004.

Although FIG. 1 shows a single instance of each component, there may be multiple instances of each component in the computing system 1000. Further, although the computing system 1000 is illustrated as a single block, the computing system 1000 may be a single physical machine or device (e.g., implemented as a single computing device, such as a single workstation, single end user device, single server, etc.), or may comprise a plurality of physical machines or devices (e.g., implemented as a server cluster). For example, the computing system 1000 may represent a group of servers or cloud computing platform providing a virtualized pool of computing resources (e.g., a virtual machine, a virtual server).

FIG. 1 further illustrates other computing systems interacting with the computing system 1000, including the user device 150 and sensors 400. Turning first to the user device 150, the user device 150 may be any electronic device capable of displaying a user interface. Examples of suitable electronic devices include wearable devices (e.g., head-mounted display (HMD) devices, augmented reality (AR) glasses, smart watches, etc.) and/or mobile devices (e.g., smartphones, tablets, laptops, etc.), among others. Examples of the present disclosure may also be implemented in non-wearable devices and/or non-mobile devices, such as desktop computing devices, workstations, tracking systems, and other computing devices. Example components of the user device 150 are now described, which are not intended to be limiting. It should be understood that there may be different implementations of the user device 150.

The shown user device 150 includes at least one hardware processor or processing unit 151, such as a processor, a microprocessor, an application-specific integrated circuit (ASIC), a field-programmable gate array (FPGA), a dedicated logic circuitry, a graphics processing unit (GPU), a central processing unit (CPU), a dedicated artificial intelligence processor unit, or combinations thereof.

The user device 150 includes at least one memory 154, which may include a volatile or non-volatile memory (e.g., a flash memory, a random access memory (RAM), and/or a read-only memory (ROM)). The non-transitory memory 154 may store instructions for execution by the processing unit 151.

The user device 150 includes at least one network interface 156 for wired or wireless communication with an external system or network (e.g., an intranet, the Internet, a P2P network, a WAN and/or a LAN), and in particular for communication with the e-commerce platform 100 in the example shown.

The user device 150 also includes at least one input/output (I/O) interface 158, which interfaces with input and output devices. In some examples, the same component may serve as both input and output device (e.g., a display 160 may be a touch-sensitive display). The user device 150 may include other input devices (e.g., buttons, microphone, touchscreen, keyboard, etc.) and other output devices (e.g., speaker, vibration unit, etc.).

The user device 150 is shown to further include a sensor system 162, which comprises one or more sensors. The one or more sensors in the sensor system 162 are configured to measure one or more physical properties of a given three-dimensional (3D) object and, if applicable, from multiple perspectives. Each perspective of the 3D object may be defined by a certain viewing angle between the 3D object and the user device 150. For example, different perspectives of the 3D object may be obtained by moving the user device 150 relative to the stationary 3D object, by moving the 3D object relative to the stationary user device 150, or moving both the user device 150 and the 3D object relative to one another. The measurements made by the sensor system 162 are referred to as sensor data.

The sensor system 162 may be configured to use a given sensor (of the one or more sensors) to measure one physical property of the given 3D object from two or more different perspectives. The sensor system 162 may additionally or alternatively measure two or more different physical properties of the given 3D object (e.g., using two or more different sensors of the one or more sensors of the sensor system 162; or using one sensor capable of measuring multiple physical properties) from the same perspective. Additionally or alternatively, the sensor system 162 may measure two or more different physical properties of the given 3D object (e.g., using the two or more different sensors; or using one sensor capable of measuring multiple physical properties) from multiple different perspectives. It should be understood that the different capabilities and configurations of the sensor system 162 may be provided separately or in combination, in various embodiments of the present disclosure.

In the example embodiment shown in FIG. 1, the sensor system 162 includes two sensors, a camera 164 and a LIDAR sensor 166. In other embodiments, the sensor system 162 may only include the camera 164. The camera 164 is adapted to capture 2D images of the 3D object from various angles between the camera 164 and the given 3D object. The measurements of the one or more physical properties may be captured in the 2D images. The camera images may be cross-referenced with measurements of the orientation/pose/angle of the user device 150 (and hence the inferred orientation/pose/angle of the camera 164) from other sensors in the sensor system 162, such as an accelerometer, gyroscope, magnetometer, GPS, etc.

The LIDAR sensor 166 is adapted to capture the 3D surface geometry or topology of the given 3D object. The sensor system 162 may alternatively or additionally include other optical sensors, and/or a different number of optical sensors, to capture different visual traits of the given 3D object, such as color, size, microsurface details, identifying marks, metallic-ness/nonmetallic-ness (e.g., luster), and surface roughness, among others. For example, the alternative or additional sensors may include an infrared (IR) camera, a spectrophotometer etc.

The example of FIG. 1 may optionally include one or more additional sensors 400 that also communicate with the computing system 1000. The additional sensor(s) 400 may correspond with the sensors in the sensor system 162 of the user device 150, and may be one or more of a camera, a LIDAR sensor, a spectrophotometer etc. The sensor system 162 may be configured to use a given sensor (of the one or more sensors) to measure one physical property of the given 3D object from two or more different perspectives. The sensor system 162 may additionally or alternatively measure two or more different physical properties of the given 3D object (e.g., using two or more different sensors of the one or more sensors of the sensor system 162; or using one sensor capable of measuring multiple physical properties) from the same perspective. Additionally or alternatively, the sensor system 162 may measure two or more different physical properties of the given 3D object (e.g., using the two or more different sensors; or using one sensor capable of measuring multiple physical properties) from multiple different perspectives. It should be understood that the different capabilities and configurations of the sensor system 162 may be provided separately or in combination, in various embodiments of the present disclosure. The one or more physical properties measured by the additional sensor (s) 400 may correspond with the one or more physical properties measured by the sensor system 162 of the user device 150. The measurements made by the additional sensor(s) 400 are referred to as reference data, and may be stored in a memory 1002 of the computing system 1000.

In some applications, the additional sensor(s) 400 may be the same sensors as those in the sensor system 162 in the user device 150. In other cases, the additional sensor(s) 400 may be more sophisticated equipment (compared to the sensors found in the user device 150), which may be used in a controlled scanning environment to acquire highly detailed scans and to make more complex measurements of a 3D object.

Returning to the computing system 1000, the memory 1002 of the computing system 1000 may contain object verification software as described herein, i.e. software which when executed by the processor 1004 verifies a 3D object with respect to a reference 3D object. In the embodiment illustrated in FIG. 1, the processor 1004 of has an object verification engine 300 to execute the object verification software. The object verification engine 300 may be in communication with the user device 150 and the memory 1002. The object verification engine 300 is shown comprising a data analyzer 302, a matching component 306, and a signal generator 310.

The data analyzer 302 is configured to obtain sensor data from the one or more sensors as described above. In that regard, the sensor data may include data representing measurements of a physical property of the given 3D object from two or more perspectives, measurements of two or more different physical properties of the given 3D object from the same perspective, or measurements of two or more different physical properties of the given 3D object from multiple perspectives. For example, if only one camera sensor is used, the sensor data may include a first measurement of a physical property from a first perspective and a second measurement of the physical property from a second perspective (where the second perspective is different from the first perspective).

In the depicted embodiment of FIG. 1, the data analyzer 302 may obtain the sensor data directly from the sensor system 162 of the user device 150. Alternatively, part or all of the sensor data may have been previously saved in the memory 1002 of the computing system 1000 or saved in the memory 154 of the user device 150, and then retrieved by the data analyzer 302.

The data analyzer 302 is also configured to retrieve the reference data, where the reference data includes measurements of the one or more physical properties of the reference 3D object. The data analyzer 302 may obtain the reference data directly from the additional sensor(s) 400. Alternatively, if part or all of the reference data was previously saved in the memory 1002 of the computing system 1000 or the memory 154 of the user device 150, part or all of the reference data may then be retrieved by the data analyzer 302. In other examples, the data analyzer 302 may retrieve or obtain part or all of the reference data from another external database (not shown).

The data analyzer 302 is then configured to compare the sensor data (based on the given 3D object) with the reference data (based on the reference 3D object). If the sensor data and the reference data are not in a format that is conducive for comparisons, the data analyzer 302 may be configured to process and transform the sensor data and/or the reference data into comparable formats.

For example, in the present embodiment, the data analyzer 302 comprises an optional model generator 304. The model generator 304 is configured to combine the measurements of the physical properties of the given 3D object (i.e. the sensor data) to generate a digital model of the given 3D object. The model generator 304 is further configured to combine the measurements of the physical properties of the reference 3D object (i.e. the reference data) to generate a reference digital model of the reference 3D object. In an alternative application, the reference digital model of the reference 3D object may have been previously generated and saved in the data facility 134, as part of the reference data 312. Thus, the data analyzer 302 may simply retrieve the reference digital model from the data facility 134.

After the candidate digital model of the given 3D object and the reference digital model of the reference 3D object have been generated or retrieved, the matching component 306 of the object verification engine 300 is configured to compare the sensor and reference data or to compare the two models. The matching component 306 may collate and compare the sensor and reference data, and/or the two models, to determine whether they match.

For example, if the sensor data (or the candidate digital model) is identical to the reference data (or the reference digital model), the differences therebetween would be zero, and the matching component 306 would identify a match. Realistically, however, given the limitations and inevitable variability when collecting the sensor and reference data, and when generating the corresponding given and reference digital models, a small portion of the sensor data (or the candidate digital model) and the reference data (or the reference digital model) is likely to be an exact match, if any at all. Thus, in some applications, the matching component 306 may be configured to align the sensor and reference data, and/or the two models, and then calculate a difference between their corresponding data points. The difference may further be aggregated. Various methods for aligning and computing the difference between two sets of 3D data may be used to perform this operation. For example, algorithms that have been developed to compare between two 3D models in typical computer-aided design (CAD) formats may be used. Other methods for aligning and computing differences between data sets include mean-square error (MSE) and peak signal-to-noise ratio (PSNR).

The matching component 306 is further configured to determine, based on that comparing, a match between the sensor and reference data or a match between the two models, i.e. whether the given 3D object matches the reference 3D object. The matching component 306 may determine that there is a match if the differences between their corresponding data points are (individually or collectively) less than a defined difference threshold. Conversely, the matching component 306 may be configured to determine that there is no match if the differences between their corresponding data points are (individually or collectively) greater than the difference threshold. For objects of high value, such as those having a commercial value greater than $100, the difference threshold may be lower. For objects of low value, such as those having a commercial value less than $20, the difference threshold may be higher.

If the match determination is based on the differences between the corresponding data points, the matching component 306 may comprise an optional confidence module 308 that is configured to determine a confidence level of the determined match (or no match) between the given 3D object and the reference 3D object. The confidence module may be configured to calculate the variability of the differences between the corresponding data points to determine the confidence level (e.g., where the variability is high, the confidence level may be low). In some applications, the confidence module 308 may be configured to calculate the standard deviation of the differences between the data points to determine the confidence level of the match/no match determination (e.g., if the standard deviation is high, the confidence level may be low). If multiple sets of sensor and reference data and/or multiple pairs of given and reference digital models are compared, the confidence module 308 may then be further configured to average the confidence levels for each pair of data and/or models or otherwise combine them to compute an overall confidence level of matching. It should be understood that the confidence module may implement any suitable algorithm to compute a statistical confidence level of the determined match (or no match) between the given 3D object and the reference 3D object.

Alternatively, rather than conducting a pair-wise statistical comparison of corresponding data sets/digital models as described above, the matching component 306 and the confidence module 308 may be configured to determine how much of the sensor data/candidate digital model matches the reference data/reference digital model in terms of the physical traits. In such applications, even if the type of the data in each set are different, the matching component 306 and the confidence module 308 may be implemented together as a machine learning-based algorithm (e.g., a trained discriminator model) to determine whether the sets of data/digital models match. The matching level may then be the overall confidence level. For example, the confidence module 308 may be implemented using a machine learning-based algorithm that has been trained to accept two sets of sensor data as input and to output a prediction of whether the two sets of sensor data match. A confidence level of the prediction may also be outputted. A suitable machine learning-based algorithm for generating such a prediction may, for example, be a discriminator model that has been trained using a generative adversarial network (GAN) architecture. In some examples, there may be different trained discriminator models implemented by the matching component and the confidence module 308, to enable prediction of a match and confidence level for different sensor data modalities and/or generated 3D models (e.g., one discriminator model may be trained to compare two sets of LIDAR data; another discriminator model may be trained to compare two sets of LIDAR data combined with RGB data; yet another discriminator model may be trained to compare one set of LIDAR data with a second set of RGB data; etc.).

Another manner in which the match (or no match) determined between the given 3D object and the reference 3D object may be made is through use of the structural similarity index measure (SSIM). SSIM it provides a decimal value between 0 and 1 that indicates the degree of similarity, where the value of 1 indicates that the sensor and reference data are identical. In the case when SSIM is used, the matching component 306 may determine that there is a match if the SSIM index is greater than a defined difference threshold (such as >0.8).

After the confidence level and the match/no match determinations are made, to make the final verification determination, the matching component 306 is further configured to decide whether the determined confidence level matches or exceeds a defined confidence threshold that is related to the reference object. For example, if the value of the reference object is low, such as cereal box coupons, the associated confidence threshold may be lower, such as 75%. If the value of the reference object is high, such as for art or rare collectible items, the associated confidence threshold may be much higher, such as 99%. In some cases, a lower confidence threshold can be set to help account for minor changes that may be made to the given object due to normal handling/wear and tear of the given object.

If a match is found between the sets of sensor and reference data and/or the computed digital models, and the overall computed confidence level matches or exceeds the associated confidence threshold for the reference object, the matching component 306 identifies a positive match and verifies the given 3D object as a matching instance of the reference 3D object. If a match is found but the overall computed confidence level falls below the confidence threshold for the reference object, the matching component 306 identifies a negative match and does not verify the given 3D object as a matching instance of the reference 3D object.

The object verification engine 300 further includes the signal generator 310, which is configured to generate and send a signal corresponding to the verification or non-verification of the given 3D object. As noted above, the present system may be useful for content access purposes. Thus, in the depicted embodiment, the signal generator 310 may generate the verification/non-verification signal and send the verification/non-verification signal to an online entity, such as an online store 138 (discussed further below with respect to FIG. 2). The online entity may then grant (to the user device 150) or withhold access to restricted software or website options, for example. In other examples, the signal generator 310 may send the verification/non-verification signal to a software platform, such as an e-commerce platform 100 (discussed further below with respect to FIG. 2), or to an Internet-enabled smart appliance (e.g., a smart lock on a door or locker), among other possibilities.

In some instances, multiple different confidence levels may be defined and used for different verification tasks. For example, a first confidence threshold may be associated with a first security level and a second confidence threshold may be associated with a second security level.

In such a case, after the confidence level and the match/no match determinations are made, the matching component 306 may be further configured to decide whether the determined confidence level matches or exceeds the first and the second confidence thresholds that are related to the reference object. If a match is found between the sets of sensor and reference data and/or the computed digital models, and the determined confidence level matches or exceeds the first, but not the second, confidence threshold, the matching component 306 may be configured to verify the given 3D object for the first security level but to not verify the given 3D object for the second security level.

The signal generator 310 may then be configured to generate and send the verification signal to the online entity (e.g., online store 138) for the first security level (but not the second security level). The online entity may then grant, to the user device 150, access to first security level software or website options, but withhold access to the second security level software or website options (that are different from the first security level software or website options).

One of the advantages of the disclosed system is that use of 3D measurements of physical properties allows for comparison of small (perhaps even micro), and a greater range of, details in order to verify whether one instance of a 3D object (the given object) matches the reference object (with a given confidence level). Obtaining and comparing 3D physical measurements of 3D objects allows for greater specificity and accuracy during verification than when verifying 2D images or verifying a 3D object using a 2D image of the 3D object.

Implementation in an E-Commerce Platform

In some examples, the object verification engine 300 may be implemented as a component of a software platform (e.g., may be provided as a service to subscribers or registered users of the software platform). One example of the present disclosure is described in the context of an e-commerce platform. However, it should be understood that the e-commerce platform is only one possible example of an online platform and is not intended to be limiting. Another example in the context of a user device is also described. In that manner, the present disclosure may be implemented in other contexts, and is not necessarily limited to implementation in an e-commerce platform or a user device.

The functionality described herein may be used in commerce to provide improved customer or buyer experiences. The e-commerce platform could implement the functionality for any of a variety of different applications, examples of which are described elsewhere herein.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 2:
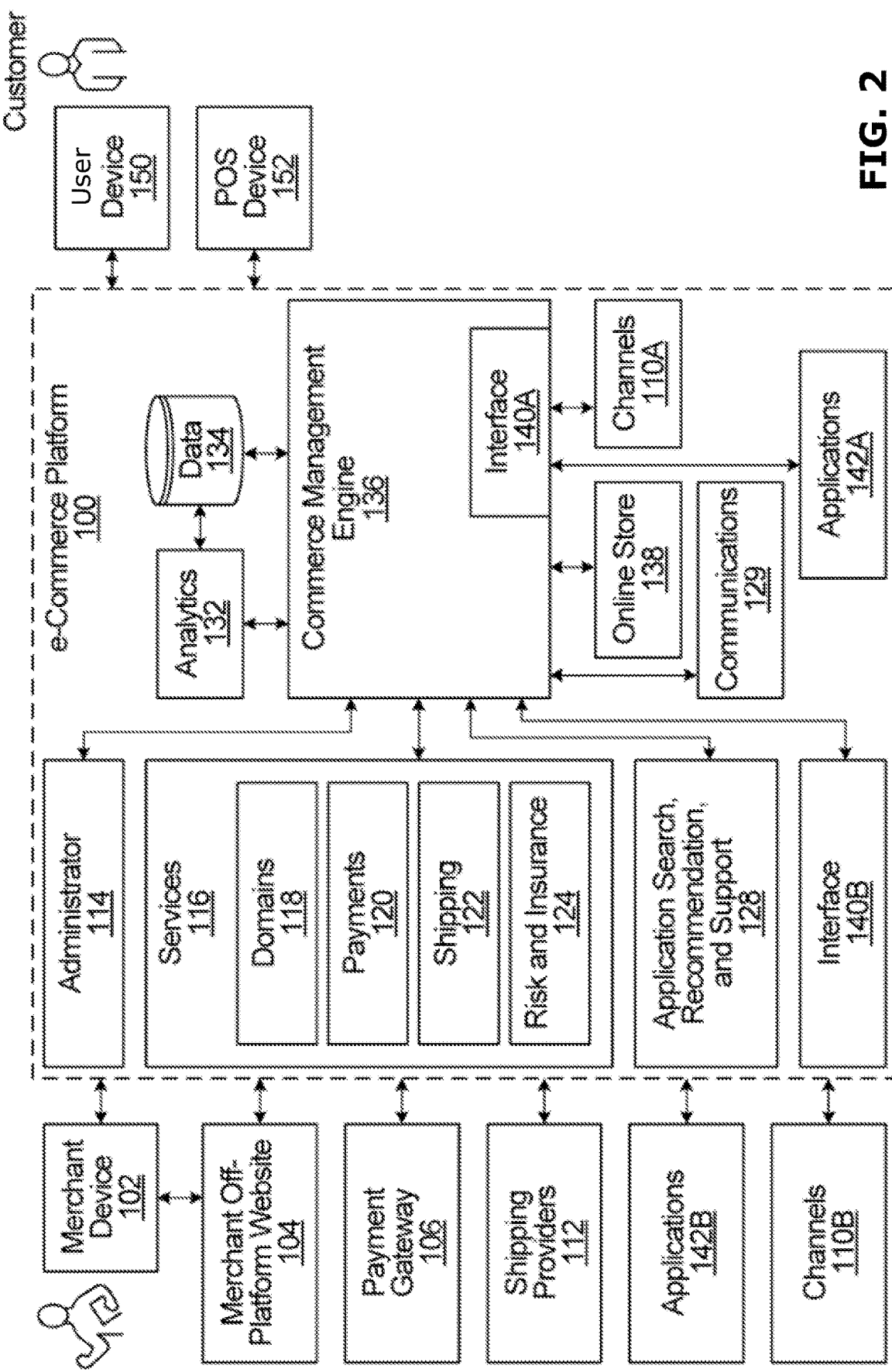
FIG. 2 is a block diagram of an example e-commerce platform and a customer device, which may be an example implementation of the system of FIG. 1.

FIG. 2 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services.

Furthermore, such facilities may, in some embodiments, may, additionally or alternatively, be provided by one or more providers/entities.

In the example of FIG. 2, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a user device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a user device 150 (using data 134) such as, for example, through a network connected to the e-commerce platform 100. For example, the online store 138 may serve or send content in response to requests for data 134 from the user device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 3:
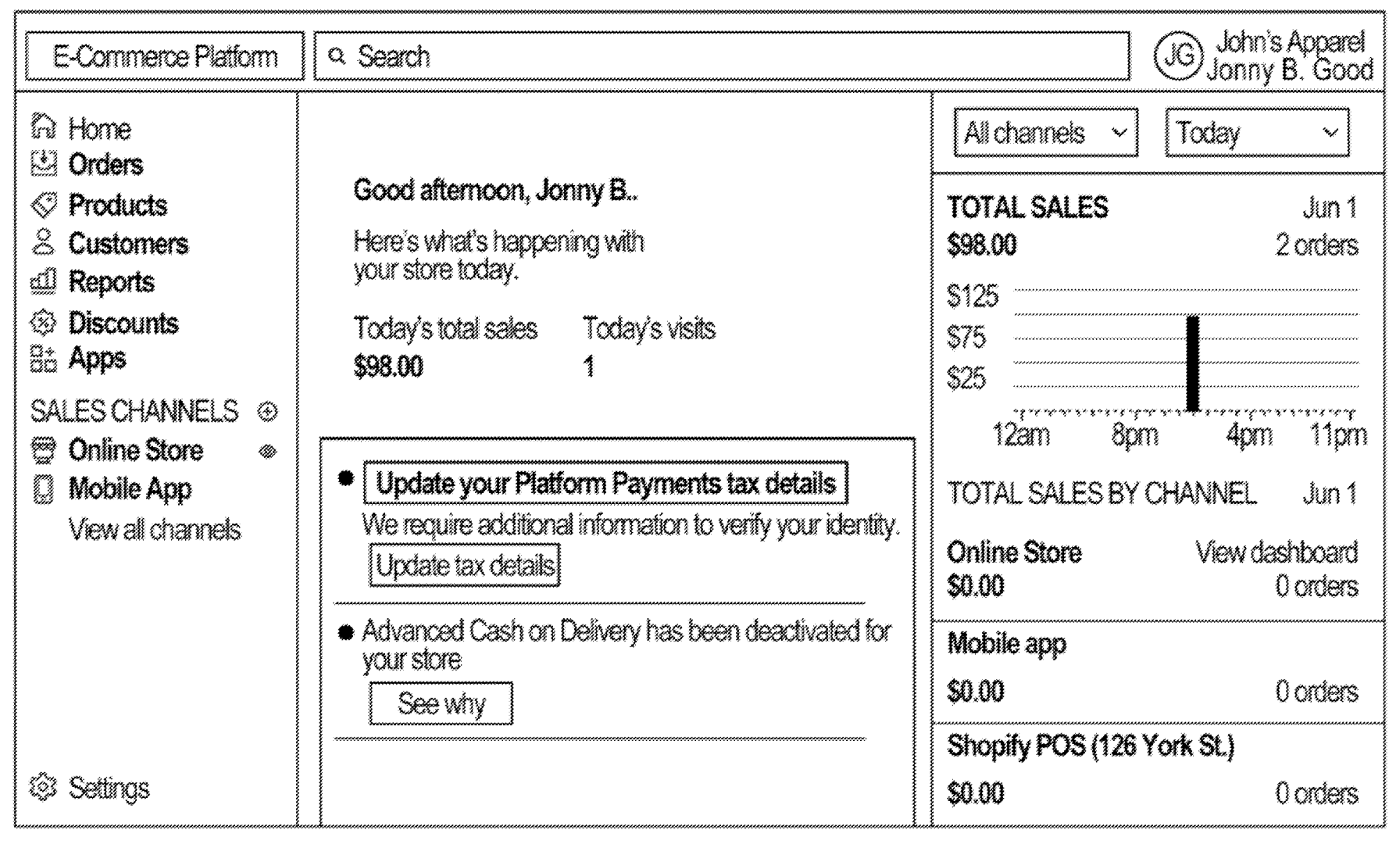

FIG. 3 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue.

Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the user device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the user device 150. In particular, the e-commerce platform 100 may provide functionality to enable content associated with an online store 138 to be displayed on the user device 150 via a UI.

Figure 4:
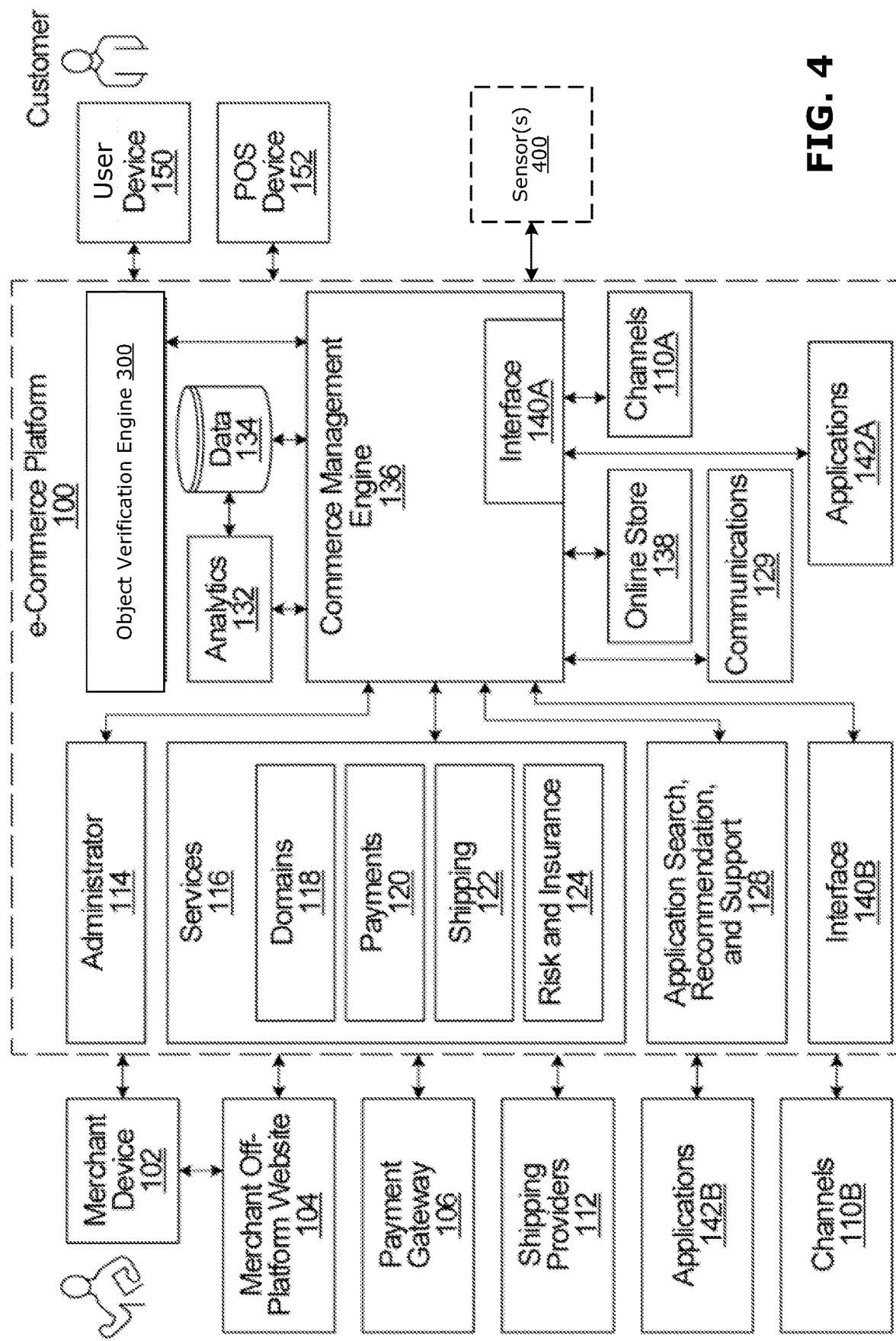
FIG. 4 is another block diagram of the example e-commerce platform of FIG. 2, including the object verification engine, and the customer device, in which examples described herein may be implemented.

FIG. 4 illustrates the e-commerce platform 100 of FIG. 2 but including the object verification engine 300 in communication with the user device 150 and sensors 400. Further details of the object verification engine 300, user device 150, and sensors 400 have been discussed above.

Although the object verification engine 300 has been illustrated as a distinct component of the e-commerce platform 100 in FIG. 4, this is only an example. The object verification engine 300 could also (or instead) be provided by another component residing within or external to the e-commerce platform 100. In some embodiments, either or both of the applications 142A-B may provide an embodiment of the object verification engine 300 that implement the functionality described herein. The location of the object verification engine 300 may be implementation specific.

In some implementations, the object verification engine 300 may be provided at least in part by the e-commerce platform 100, either as a core function of the e-commerce platform 100 or as one or more applications or services supported by or communicating with the e-commerce platform 100. For simplicity, the present disclosure describes the operation of the object verification engine 300 when the object verification engine 300 is implemented in the e-commerce platform 100, however this is not intended to be limiting. For example, as will be further described below, at least some functions of the object verification engine 300 may be additionally or alternatively be implemented on the user device 150.

In some implementations, the examples disclosed herein may be implemented using a different platform that is not necessarily (or is not limited to) the e-commerce platform 100. In general, examples of the present disclosure are not intended to be limited to implementation on the e-commerce platform 100.

Implementation on a User Device

As mentioned above, the present system may be implemented apart from the e-commerce system 100. For example, at least some functions of the object verification engine 300 may be implemented on a user device 550.

Figure 6:
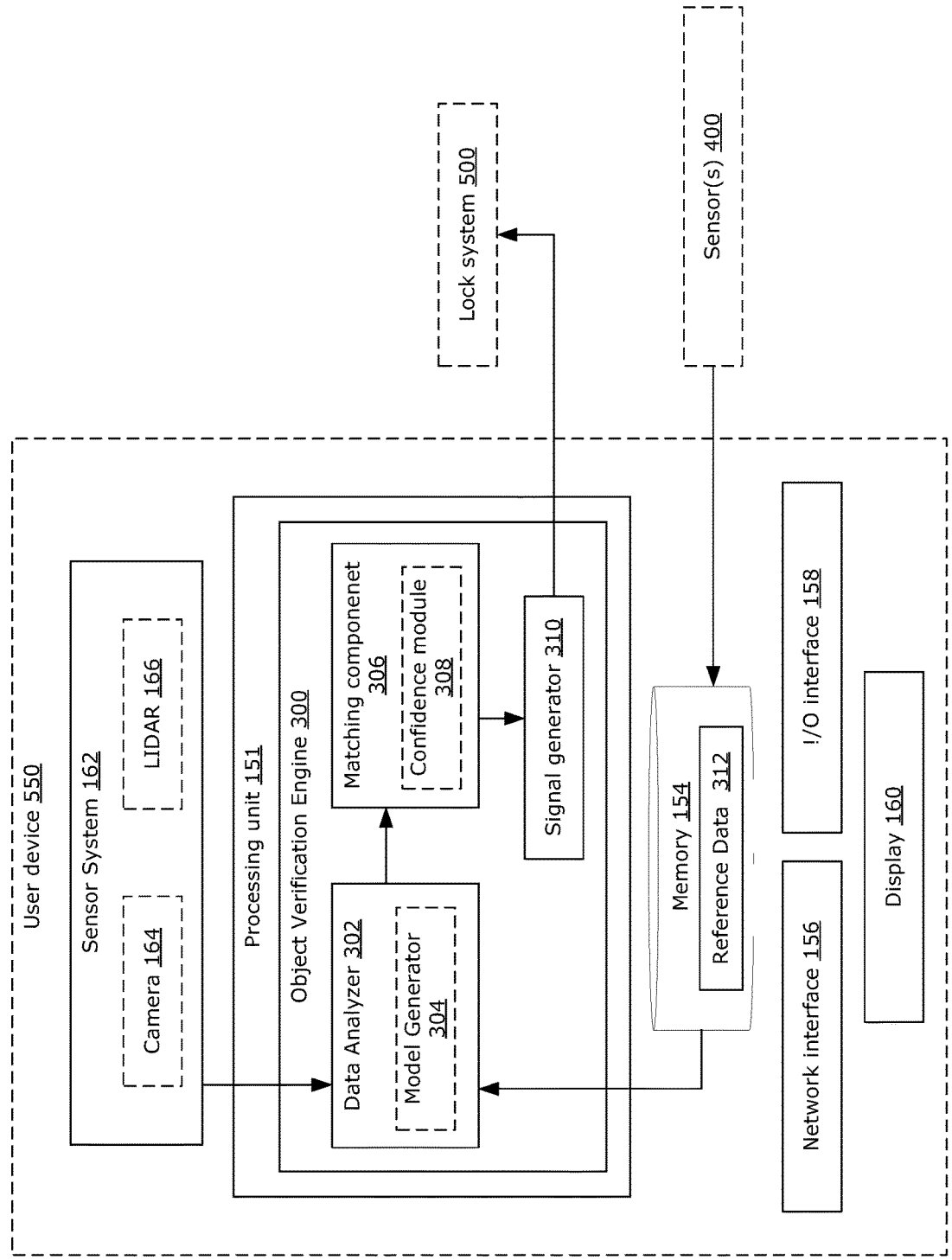
FIG. 6 is a block diagram of an alternate embodiment of a system of the present disclosure in which examples described herein may be implemented.

FIG. 6 is a depiction of the user device 550 that comprises components that are relevant to object verification via confidence level of matching between a 3D object and a reference 3D object. FIG. 6 illustrates other computing systems interacting with the user device 150, including external sensors 400 and a lock system 500.

Similar to the user device 150 described above, the user device 550 shown in FIG. 6 may be any electronic device capable of displaying a user interface. Examples of suitable electronic devices include wearable devices (e.g., HMD devices, AR glasses, smart watches, etc.) and/or mobile devices (e.g., smartphones, tablets, laptops, etc.), among others. Examples of the present disclosure may also be implemented in non-wearable devices and/or non-mobile devices, such as desktop computing devices, workstations, tracking systems, and other computing devices. It should be understood that there may be different implementations of the user device 550.

Example components of the user device 550 may largely be similar to the components described above for the user device 150, which are not intended to be limiting. Similar to the user device 150, the user device 550 comprises a hardware processor or processing unit 151, at least one memory 154, at least one network interface 156, at least one I/O interface 158, a display 160, and a sensor system 162.

Figure 5:
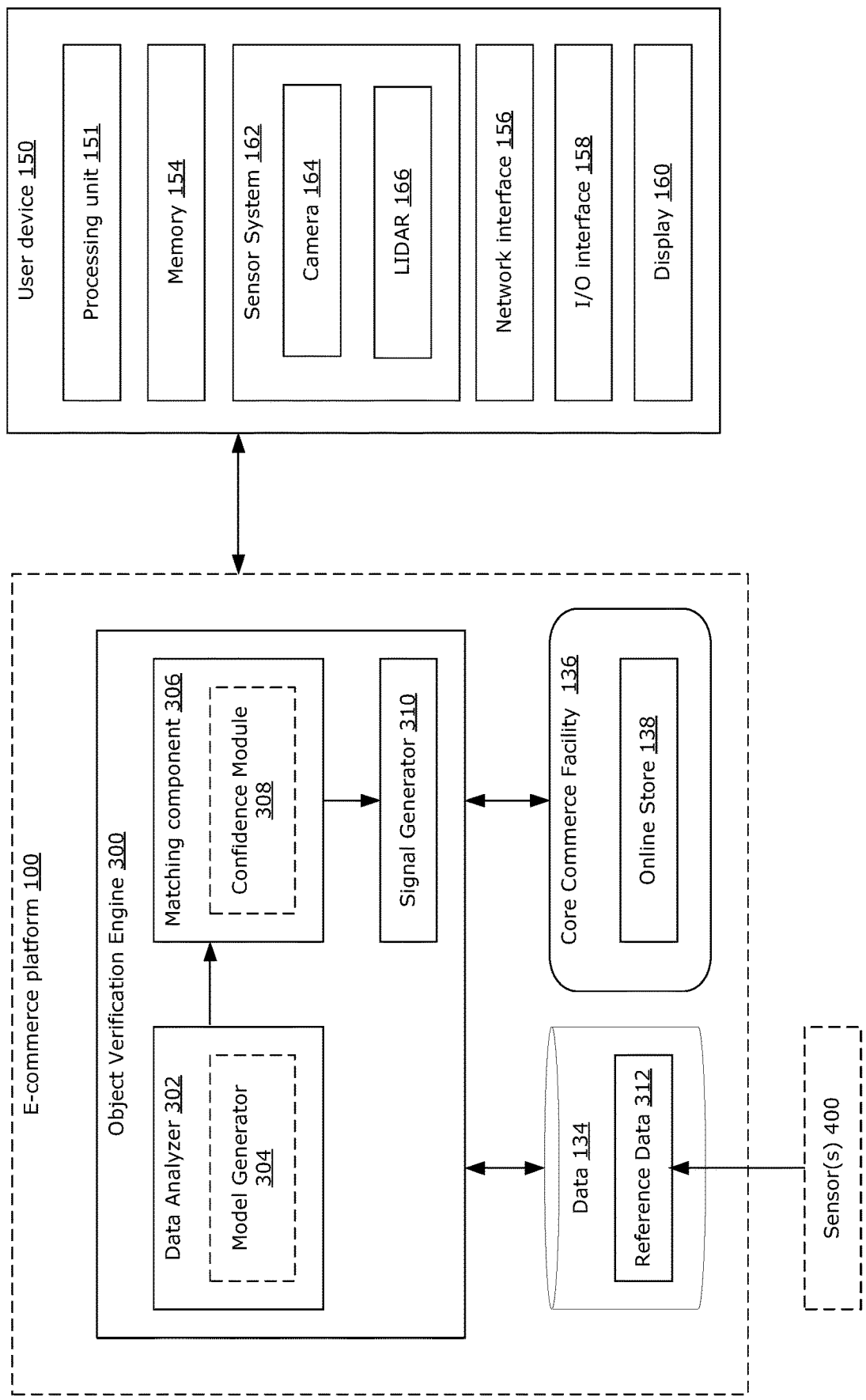
FIG. 5 is another block diagram of the e-commerce platform of FIG. 2, showing details related to the object verification engine and the customer device.

Unlike the user device 150 described above, the processing unit 151 of the user device 550 includes the object verification engine 300 with the data analyzer 302, the matching component 306 and the signal generator 310. Further, the memory 154 of the user device 550 may also store the reference data 312. The object verification engine 300, the sensor system 162, and the additional sensors 400 may all be configured in a similar manner as that described above with respect to FIG. 5. It should be understood that the user device 550 may also be used as the user device 150 as depicted in FIG. 5.

As noted above, the signal generator 310 is also configured to generate and send a signal corresponding to the verification or non-verification of the given 3D object. In the present case, the user device 550 may be useful for security purposes. In that regard, the signal generator 310 may generate the verification/non-verification signal and send the verification/non-verification signal to a lock system 500. The lock system 500 may, for example, be a remotely controllable lock system 500 that is coupled to or integrated with a physical lock. For example, the signal generator 310 may, using the network interface 156 of the user device 550, send the verification/non-verification signal wirelessly to the lock system 500 (e.g., via a wireless network such as the Internet). In other examples, the signal generator 310 may use a short-range wireless interface of the user device 550 (e.g., a Bluetooth or ZigBee interface) to send the verification/non-verification signal wireless to the lock system 500. In other examples, a wired connection may be used to send the verification/non-verification signal to the lock system 500. Other mechanisms for transmitting the verification/non-verification signal from the user device 550 to the lock system 500 may be used. Upon receiving the verification signal, for example, the lock system 500 may then lock or unlock the physical lock (e.g., may unlock the physical lock in response to a verification signal, or may maintain the physical lock in the locked state in response to a non-verification signal).

If a match is found between the sets of sensor and reference data and/or the computed digital models, and the determined confidence level matches or exceeds the first, but not the second, confidence threshold, the matching component 306 may be configured to verify the given 3D object for the first security level and to not verify the given 3D object for the second security level.

In the present case, the signal generator 310 may then be configured to generate and send the verification signal to the lock system 500 for the first security level (but not the second security level). The lock system 500 may then grant access to a first security level lock (such as the lock on an outer gate around a building), but withhold access to a second security level lock (such as the lock on a front door of the building).

By way of further enhancements, the sensor system 162 may alternatively or additionally include other sensors that measure non-optical/non-visual properties of the 3D object, such as weight, heat radiation, and electromagnetic field, among others. In such cases, the alternative or additional sensors may include a heat-flow meter, a scale, a RF sensor etc. These properties may be used in combination with the visual/optical properties captured by the optical sensors in order to determine and/or verify whether the 3D object matches the reference 3D object.

One of the advantages of the present system, is that use of 3D measurements of physical properties allows for comparison of small (perhaps even micro), and a greater range of, details in order to verify whether one instance of a 3D object (the given object) matches the reference 3D object (with a given confidence level). Both the defined difference threshold and the confidence threshold can be adjusted in response to the desired level of security. Obtaining and comparing 3D physical measurements of 3D objects helps to allow for greater specificity and accuracy during verification than when verifying 2D images or verifying a 3D object using a 2D image of the 3D object.

Method

Figure 7:
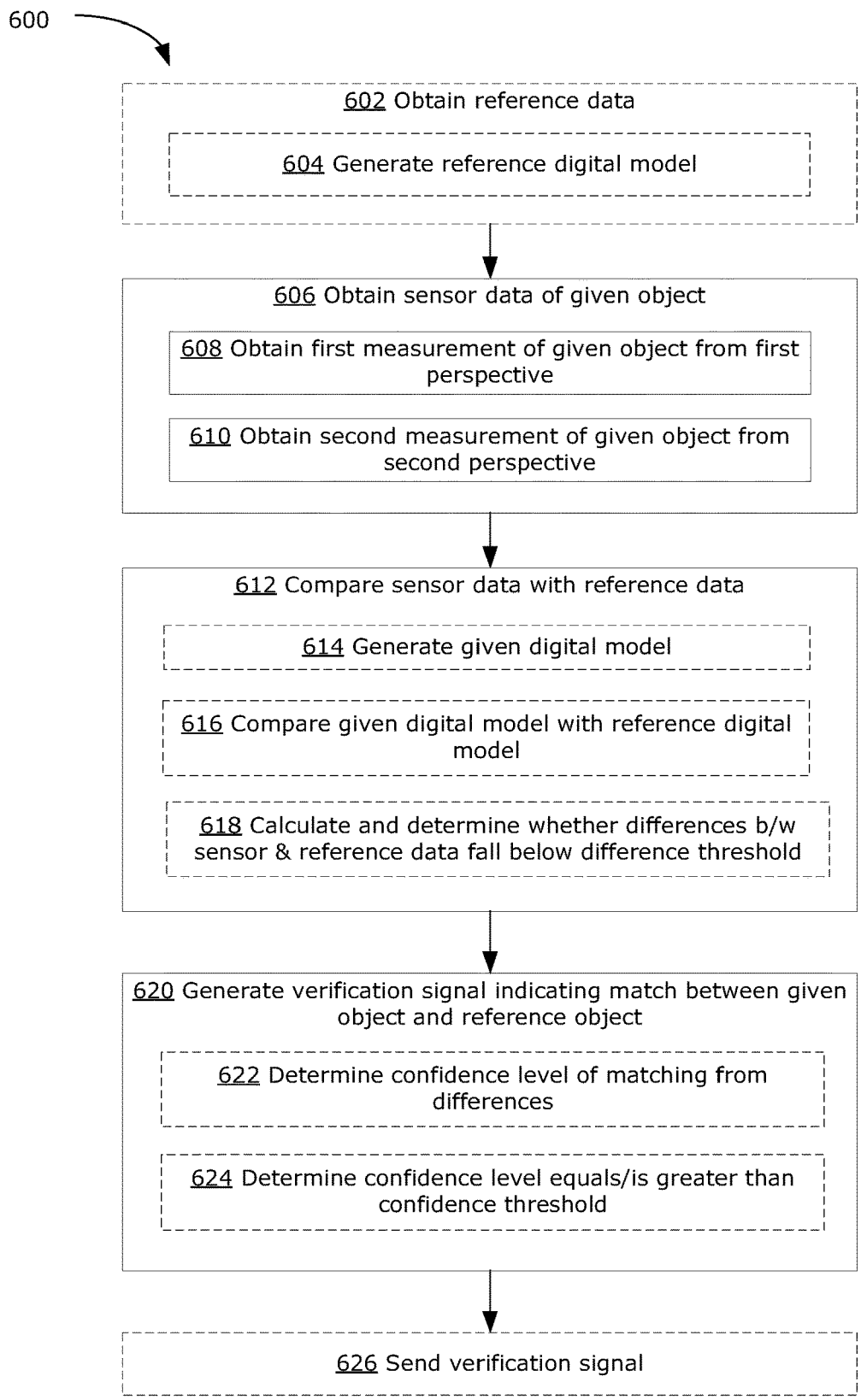
FIG. 7 is a flowchart illustrating a method for object verification according to examples of the present disclosure.

FIG. 7 is a flowchart illustrating an example method 600 for object verification by matching a 3D object with respect to a reference 3D object. The example method 600 may be performed by the e-commerce platform 100 and/or the user device 150, 550 using the object verification engine 300 and the sensor system 162, for example. In particular, the method 600 may be performed in real-time (or near real-time) as the user captures or obtains the sensor data.

Optionally, method 600 may include first establishing a reference of the reference 3D object. At an operation 602, reference data 312 may be obtained from one or more sensors, such as additional sensor(s) 400, including measurements and/or calculations of one or more physical properties of the reference 3D object. The reference data 312 pertaining to the reference 3D object may then be stored for future comparison.

For example, if the one or more sensors includes a camera, the reference data 312 obtained may include multiple high definition images or a video of the reference object at various views and perspectives. The camera images may be cross-referenced with measurements of the orientation/pose/angle of the camera from other sensors (such as an accelerometer, gyroscope, magnetometer, GPS, etc.).

In some applications, a hologram may be applied to the reference object, and the unique way in which the hologram interacts with light (e.g., how the appearance of the hologram changes with different viewing angles) may be measured. Holograms are stacked images that provide different visual effects (i.e. multi-level and/or multi-color) depending on the angle at which it is viewed by the camera/viewer. Thus, when an image is taken of the reference object and the hologram, the image and/or color of the hologram in the image may be used to as an indication of the particular perspective/angle of the given object relative to the camera.

If the one or more sensors includes a LIDAR sensor or other depth sensor, the reference data 312 obtained may include depth information related to the reference object (e.g., to map out the surface geometry of the object). If the one or more sensors includes optical sensors, the reference data 312 obtained may include detection of light scattering from the reference object. The reference data 312 may alternatively or additionally be obtained by using image analysis of the images/video to determine the reference object's material composition and/or surface texture. The reference data 312 may further include measurements of other physical aspects of the reference object including color, size, microsurface details, identifying marks, metallic-ness/nonmetallic-ness (e.g., luster), and surface roughness, among others.

At an operation 604, a reference digital model may be generated from the obtained reference data 312. The reference data 312 may be inputted into a program to develop a reference digital model of the reference object. The reference digital model may be a thorough three-dimensional model of the reference object, in combination with the relevant color, size, microsurface detail, etc. as collected from the additional sensor(s) 400. This reference data 312 and the computed reference digital model may be stored (for example, in the data facility 134 and/or the memory 154 of the user device 150, 550) for future comparison purposes.

At an operation 606, sensor data of the given 3D object is then obtained. The sensor data may be obtained using the same or similar sensors as those described above to obtain the reference data. Such sensors may form part of the sensor system 162 of the user device 150, 550. As noted above, the sensor data includes measurements of one or more physical properties of the given 3D object. At an operation 608, a first measurement of the one or more physical properties is obtained from a first perspective. At an operation 610, a second measurement of the one or more physical properties is obtained from a second perspective, where the second perspective is different from the first perspective.

The first and second measurements may be obtained using the same sensor (of the one or more sensors of the sensor system 162) to measure one physical property of the given 3D object from at least two different perspectives. The first and second measurements may be of two or more different physical properties of the given 3D object (e.g., obtained using two or more different sensors of the one or more sensors of the sensor system 162; or using one sensor capable of measuring multiple physical properties) from the same perspective. Additionally or alternatively, the first and second measurements may be of two or more different physical properties of the given 3D object (e.g., obtained using the two or more different sensors; or using one sensor capable of measuring multiple physical properties) obtained from multiple different perspectives. It should be understood that different measurements of different physical properties from one or more different perspectives may be obtained in various embodiments of the present disclosure.

If the sensors in the sensor system 162 of the user device 150, 550 includes a camera, the sensor data obtained may include multiple high definition 2D images or a video of the given 3D object at various views and perspectives. The camera images may be cross-referenced with measurements of the orientation/pose/angle of the camera from other sensors (such as an accelerometer, gyroscope, magnetometer, GPS, etc.).

In order to help identify the spatial relationship between the given 3D object and the sensors on the user device 150, 550 (e.g., the camera 164), a hologram may have been applied to the given 3D object. The user may be prompted to capture an image/video of the hologram at different angles, and this data can then be used to compute/confirm the angle at which other sensor data was obtained. For example, the appearance of the hologram at different viewing angles may be known (e.g., may be stored as part of the reference data). Thus, the appearance of the hologram in the captured sensor data may be used to infer the viewing angle between the given 3D object and the sensors on the user device 150, 550. Additionally and optionally, by confirming that the hologram has the expected optical properties exhibited at different angles (and thus is an authentic hologram), the authenticity of the object may also be indirectly determined.

The given 3D object may also be scanned as described above regarding the reference data for corresponding physical traits, including 3D shape, color, size, microsurface detail, identifying marks, metallic-ness/nonmetallic-ness (e.g., luster), surface roughness, etc. The one or more physical properties of the given 3D object to be measured may include a material composition of the given 3D object based on light scattering from the given 3D object captured in the 2D images of the given 3D object.

While it is not necessary that the volume and type of scanning data of the given 3D object be the same as that taken for the reference data, a defined minimum amount of scanning data of the given 3D object must be collected as the sensor data. The defined minimum amount of scanning data of the given 3D object that must be collected may depend on the desired security level, as discussed further below.

At an operation 612, the sensor data is then compared with the reference data. The operation 612 may be performed using optional operations 614, 616, and/or 618 for example.

As noted above, the sensor data and the reference data may not be in a format that is conducive for comparisons and the sensor data may have to be processed into a comparable format. Thus, at an operation 614, the measurements of the one or more physical properties of the given 3D object may be combined to generate a candidate digital model of the given 3D object. The sensor data may also be inputted into the same program as described above to develop a candidate digital model of the given 3D object. For example, the sensor data may be uploaded to the e-commerce platform 100 or another cloud-based service that processes the sensor data to generate the candidate digital model. In any case, the e-commerce platform 100 and/or the user device 150, 550 may then store the sensor data and/or the computed candidate digital model in the data facility 134 or the memory 154.

At an operation 616, the candidate digital model of the given 3D object may be compared with the reference data or the reference digital model of the reference 3D object. In some instances, a machine learning model may be trained to compare the sensor data directly with the reference digital model, so generating a candidate digital model may not be necessary.

Alternatively or additionally, the sensor data related to the given 3D object may be compared with the reference data related to the reference 3D object. At an operation 618, differences between the sensor data and the reference data may be calculated, and whether the differences fall below a defined difference threshold may be determined. If the differences fall below the defined difference threshold, a match may be determined. If the differences exceed the defined difference threshold, a match is not determined.

For example, when comparing the candidate digital model with the reference digital model, the candidate digital model and the reference digital model may be collated/aligned to superimpose them together. A difference at each data point (x,y) or (x, y, z) may then be computed and aggregated. A match may be found if the difference is determined to be less than the difference threshold. The difference may be in terms of distance, color value, or metallic value etc.

At an operation 620, a verification signal indicating a match between the given 3D object and the reference 3D object is generated based on the comparing at the operation 612. The operation 620 may be performed using optional operations 622 and/or 624, for example.

At an operation 622, a confidence level of matching between the given 3D object and the reference 3D object may be determined. The confidence level of the match/no match may be determined based on the differences z calculated at the operation 618, and more specifically, may be the standard deviation of the z differences. The confidence levels for each pair of x, y data points may then be averaged or otherwise combined, in a weighted sum for example, to compute an overall confidence level of matching. If multiple sets of sensor and reference data and/or multiple pairs of given and reference digital models are compared, the confidence levels for each pair of data and/or models may be averaged or otherwise combined to compute an overall confidence level of matching.

Alternatively, rather than conducting a pair-wise statistical comparison of corresponding data sets/digital models, how much of the sensor data/candidate digital model matches the reference data/reference digital model in terms of the physical traits may be determined. In such applications, even if the type of the data in each set are different, a machine learning-based algorithm (e.g., a trained discriminator model) may be used to determine whether the sets of data/digital models match. The matching level may then be the overall confidence level.

To make the final verification determination, the e-commerce system 100 and/or the user device 150, 550 may identify a defined confidence threshold that is related to the reference 3D object as described above. Then at an operation 624, it may be determined whether the confidence level (determined at the operation 622) equals or exceeds the confidence threshold. If the determined confidence level equals or exceeds the confidence threshold, the given 3D object may be verified as matching the reference 3D object.

Thus, at the operation 620, if a match is found between the sensor and reference data and/or the given and reference digital models, and the overall computed confidence level matches or exceeds the associated confidence threshold for the reference 3D object, the given 3D object may be verified as matching the reference 3D object and a verification signal is generated. If a match is found but the overall computed confidence level falls below the confidence threshold for the reference 3D object, the given 3D object is not verified as matching the reference 3D object, and a non-verification signal is generated or no verification signal is generated.

At an operation 626, the verification or non-verification signal may then be sent to the corresponding entity. The verification signal may be an unlocking signal, which may be sent to a lock system (for example) to unlock a physical lock. The verification signal may also (or instead) be an access signal sent to an e-commerce platform (for example) grant access to restricted software or website options. Other security or verification actions may alternatively be performed in view of the verification of the given 3D object.

As noted above, multiple different confidence levels may be defined and used for different verification tasks. For example, a first confidence threshold may be associated with a first security level and a second confidence threshold may be associated with a second security level. If a match is found between the sets of sensor and reference data and/or the computed digital models, and the determined confidence level matches or exceeds the first, but not the second, confidence threshold, the given 3D object may be verified for the first security level but not for the second security level. Thus, the verification signal that is sent may grant access past the first security level, but withhold access past the second security level.

An advantages as may be provided by the subject matter of the present application is that use of 3D measurements of physical properties allows for comparison of small (perhaps even micro), and a greater range of, details in order to verify whether one instance of a 3D object (the given object) matches the reference 3D object (with a given confidence level). Both the defined difference threshold and the confidence threshold can be tailored and adjusted in response to the desired level of security. If a higher level of security is desired, the difference threshold may be set lower, and the confidence threshold may be set higher. If a lower level of security is sufficient, the difference threshold may be set higher, and the confidence threshold may be set lower. Obtaining and comparing 3D physical measurements of 3D objects allows for greater specificity and accuracy during verification than when comparing and verifying 2D images or verifying a 3D object using a 2D image of the 3D object.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising:
   memory storing reference data, the reference data including measurements of one or more physical properties of a reference 3D object; and
   a processing unit coupled to the memory and configured to execute instructions to cause the system to:
      obtain sensor data, from one or more sensors, the sensor data including measurements of one or more physical properties of a given three-dimensional (3D) object, wherein the sensor data comprises a first measurement of the one or more physical properties of the given 3D object from a first perspective and a second measurement of the one or more physical properties of the given 3D object from a second perspective, the second perspective being different from the first perspective;
      compare the sensor data, comprising the first and second measurements, with the reference data; and
      generate, based on the comparing, a verification signal indicating a determined match between the given 3D object and the reference 3D object.

2. The system of claim 1, wherein the processing unit is further configured to execute instructions to cause the system to compare the sensor data with the reference data by:
   combining the measurements of the one or more physical properties of the given 3D object to generate a candidate digital model of the given 3D object; and
   comparing the candidate digital model of the given 3D object with the reference data comprising a reference digital model of the reference 3D object.

3. The system of claim 1, wherein the processing unit is further configured to execute instructions to cause the system to compare the sensor data with the reference data by calculating differences between the sensor data and the reference data, and determining that the differences falls below a defined difference threshold.

4. The system of claim 3, wherein the processing unit is further configured to execute instructions to cause the system to generate the verification signal indicating the determined match by:
   determining, from the calculated differences, a confidence level of the determined match between the given 3D object and the reference 3D object; and
   in response to determining that the confidence level matches or exceeds a defined confidence threshold, generating the verification signal.

5. The system of claim 4, wherein the determined confidence level matches or exceeds a first confidence threshold associated with a first security level and falls below a second confidence threshold associated with a second security level, the defined confidence threshold being the first confidence threshold, and
   the processing unit being further configured to generate the verification signal indicating the determined match for the given 3D object for the first security level and indicating no match for the given 3D object for the second security level.

6. The system of claim 1, further comprising the one or more sensors configured to obtain the sensor data.

7. The system of claim 6, wherein at least one of the one or more sensors is a camera, the processing unit being further configured to execute instructions to cause the system to obtain sensor data by:
   obtaining, from the camera, at least two 2D images of the 3D object from the first and second perspectives between the camera and the given 3D object, wherein measurements of at least one of the one or more physical properties are captured in the at least two 2D images of the 3D object.

8. The system of claim 6, wherein at least one of the one or more sensors is a LIDAR sensor and one of the one or more physical properties of the given 3D object is a 3D surface geometry or topology.

9. The system of claim 1, wherein the processing unit is further configured to execute instructions to cause the system to generate, as the verification signal, an unlocking signal to unlock a physical lock, or an access signal to grant access to restricted software or website options.

10. A computer-implemented method comprising:
   obtaining sensor data, from one or more sensors, the sensor data including measurements of one or more physical properties of a given three-dimensional (3D) object, wherein the sensor data comprises a first measurement of the one or more physical properties of the given 3D object from a first perspective and a second measurement of the one or more physical properties of the given 3D object from a second perspective, the second perspective being different from the first perspective;

comparing the sensor data with reference data, the sensor data comprising the first and second measurements, and the reference data including measurements of one or more corresponding physical properties of a reference 3D object; and generating, based on the comparing, a verification signal indicating a determined match between the given 3D object and the reference 3D object.

11. The method of claim 10, wherein comparing the sensor data with the reference data comprises:

combining the measurements of the one or more physical properties of the given 3D object to generate a candidate digital model of the given 3D object; and comparing the candidate digital model of the given 3D object with the reference data comprising a reference digital model of the reference 3D object.

12. The method of claim 10, wherein comparing the sensor data with the reference data comprises calculating differences between the sensor data and the reference data, and determining that the differences falls below a defined difference threshold.

13. The method of claim 12, wherein generating the verification signal indicating the determined match further comprises:

Determining, from the calculated difference, a confidence level of matching between the given 3D object and the reference 3D object; and in response to a determination that the confidence level equals or exceeds a defined confidence threshold, generating the verification signal.

14. The method of claim 13, wherein the determined confidence level matches or exceeds a first confidence threshold associated with a first security level and falls below a second confidence threshold associated with a second security level, the defined confidence threshold being the first confidence threshold, and wherein the given 3D object is verified for the first security level and not verified for the second security level.

15. The method of claim 14, wherein the given 3D object comprises a hologram, and each of the at least two 2D images of the 3D object includes a respective image of the hologram, a state of the hologram captured in each respective image being used to correlate to the respective perspective of the given 3D object in each 2D image.

16. The method of claim 10, wherein at least one of the one or more sensors is a camera and wherein the sensor data includes at least two 2D images of the 3D object obtained from different perspectives between the camera and the given 3D object, and wherein measurements of at least one of the one or more physical properties are captured in the at least two 2D images of the 3D object.

17. The method of claim 10, wherein the one or more physical properties of the given 3D object comprises one or more of color, size, microsurface detail, identifying marks, metallic-ness/nonmetallic-ness, and surface roughness.

18. The method of claim 10, wherein the one or more physical properties comprises a material composition of the given 3D object based on light scattering from the given 3D object captured in the at least two 2D images of the given 3D object.

19. The method of claim 10, wherein one of the one or more sensors is a LIDAR sensor and one of the one or more physical properties of the given 3D object is a 3D surface geometry or topology.

20. The method of claim 10, further comprising obtaining reference data, from one or more sensors, including measurements of the one or more corresponding physical properties of the reference 3D object and storing the one or more corresponding physical properties of the reference 3D object for comparison.

21. The method of claim 10, further comprising, generating, as the verification signal, an unlocking signal to unlock a physical lock, or an access signal to grant access to restricted software or website options.

22. A computer-readable medium storing instructions that, when executed by a processor of a system, causes the system to:

obtain sensor data, from one or more sensors, the sensor data including measurements of one or more physical properties of a given three-dimensional (3D) object, wherein the sensor data comprises a first measurement of the one or more physical properties of the given 3D object from a first perspective and a second measurement of the one or more physical properties of the given 3D object from a second perspective, the second perspective being different from the first perspective;

compare the sensor data with reference data, the sensor data comprising the first and second measurements, and the reference data including measurements of one or more corresponding physical properties of a reference 3D object; and generate, based on the comparing, a verification signal indicating a determined match between the given 3D object and the reference 3D object.

* * * * *